(12) United States Patent
Slattery et al.

(10) Patent No.: US 12,060,071 B2
(45) Date of Patent: Aug. 13, 2024

(54) PERFORMANCE LIMITER

(71) Applicant: Rivian IP Holdings, LLC, Plymouth, MI (US)

(72) Inventors: Michael P. Slattery, Irvine, CA (US); Oliver Jeromin, Bloomfield Hills, MI (US)

(73) Assignee: Rivian IP Holdings, LLC, Irvine, CA (US)

( * ) Notice: Subject to any disclaimer, the term of this patent is extended or adjusted under 35 U.S.C. 154(b) by 111 days.

(21) Appl. No.: 17/534,824

(22) Filed: Nov. 24, 2021

(65) Prior Publication Data

US 2023/0159044 A1 May 25, 2023

(51) Int. Cl.
| | |
|---|---|
| *B60W 50/12* | (2012.01) |
| *B60W 40/09* | (2012.01) |
| *B60W 50/08* | (2020.01) |
| *B60W 40/08* | (2012.01) |
| *B60W 50/00* | (2006.01) |

(52) U.S. Cl.
CPC ............ *B60W 50/12* (2013.01); *B60W 40/09* (2013.01); *B60W 50/082* (2013.01); *B60W 2040/0809* (2013.01); *B60W 2050/0064* (2013.01); *B60W 2050/0065* (2013.01); *B60W 2540/043* (2020.02); *B60W 2540/30* (2013.01)

(58) Field of Classification Search
CPC . B60W 2040/0809; B60W 2050/0064; B60W 2050/0065; B60W 2540/043; B60W 2540/30; B60W 40/09; B60W 50/082
See application file for complete search history.

(56) References Cited

U.S. PATENT DOCUMENTS

| | | | | |
|---|---|---|---|---|
| 10,703,379 | B1* | 7/2020 | Harvey | B60W 40/09 |
| 11,079,753 | B1* | 8/2021 | Roy | G05D 1/0088 |
| 11,176,562 | B1* | 11/2021 | Harvey | G06Q 30/0645 |
| 2016/0288796 | A1* | 10/2016 | Yuan | B60W 40/08 |
| 2018/0208204 | A1* | 7/2018 | Chen | G06N 20/00 |
| 2019/0195644 | A1* | 6/2019 | Scheufler | H04L 63/105 |
| 2021/0001810 | A1* | 1/2021 | Rivard | G06V 40/172 |
| 2022/0242213 | A1* | 8/2022 | Bartz | B60L 15/20 |
| 2022/0341741 | A1* | 10/2022 | Lu | G06Q 50/40 |

* cited by examiner

*Primary Examiner* — Jaime Figueroa
*Assistant Examiner* — Zachary Joseph Wallace
(74) *Attorney, Agent, or Firm* — Patterson + Sheridan, LLP

(57) ABSTRACT

Disclosed embodiments include systems, vehicles, and computer-implemented methods for selectively restricting a performance attribute of a vehicle for an operator or group of operators. In an illustrative embodiment, a computing device includes a processor and computer-readable media configured to store computer-executable instructions configured to cause the processor to: identify an operating credential associated with an operator of a vehicle; determine a performance mode associated with the operating credential; and restrict at least one performance attribute of the vehicle in accordance with the performance mode.

20 Claims, 15 Drawing Sheets

PERFORMANCE LIMITER

INTRODUCTION

To drive a vehicle with a motor or engine capable of high torque, new operators may need time to adapt to the capability of the vehicle. For example, some electric automobiles have high torque motors that may be capable of high acceleration. Operators who are inexperienced with such vehicles may be surprised by the high acceleration. Some operators have some difficulty in controlling such vehicles and may tend to have a high incident rate until they become accustomed to the power of such vehicles.

SUMMARY

Disclosed embodiments include systems, vehicles, and computer-implemented methods for selectively restricting a performance attribute of a vehicle for an operator or group of operators.

In an illustrative embodiment, a computing device includes a processor and computer-readable media configured to store computer-executable instructions configured to cause the processor to: identify an operating credential associated with an operator of a vehicle; determine a performance mode associated with the operating credential; and restrict at least one performance attribute of the vehicle in accordance with the performance mode.

In another illustrative embodiment, a vehicle includes a cabin, a drive system, and a computing device that includes a processor and computer-readable media configured to store computer-executable instructions configured to cause the processor to: identify an operating credential associated with an operator of a vehicle; determine a performance mode associated with the operating credential; and restrict at least one performance attribute of the vehicle in accordance with the performance mode.

In another illustrative embodiment, a computer-implemented method includes identifying an operating credential associated with an operator of a vehicle; determining a performance mode associated with the operating credential; and restricting at least one performance attribute of the vehicle chosen from acceleration and speed in accordance with the performance mode.

Further features, advantages, and areas of applicability will become apparent from the description provided herein. It will be appreciated that the description and specific examples are intended for purposes of illustration only and are not intended to limit the scope of the present disclosure.

DRAWINGS

The drawings described herein are for illustration purposes only and are not intended to limit the scope of the present disclosure in any way. The components in the figures are not necessarily to scale, with emphasis instead being placed upon illustrating the principles of the disclosed embodiments. In the drawings.

Figure 1:
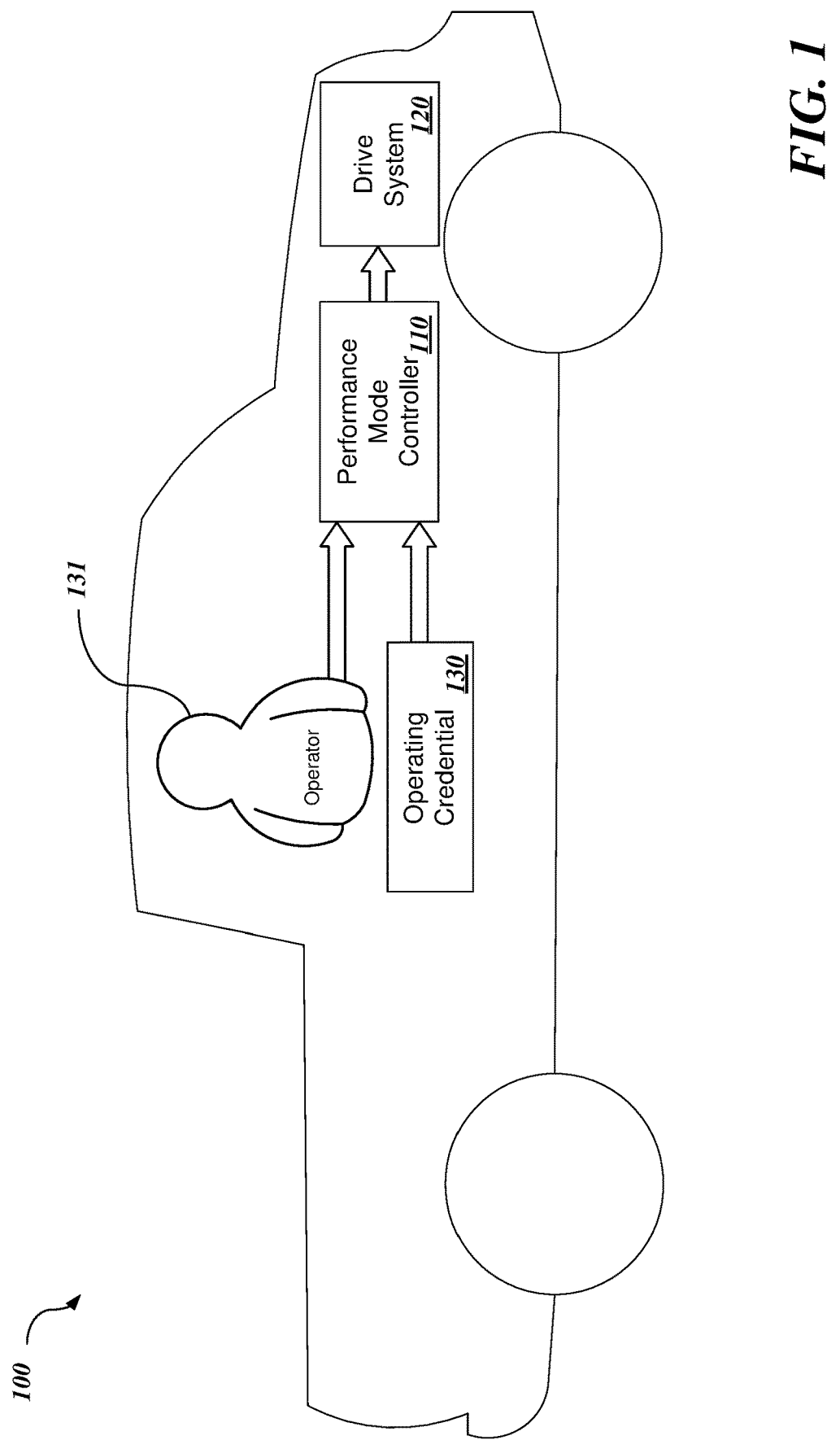
FIG. 1 is a block diagram of a vehicle including a performance mode controller.
Figure 10:
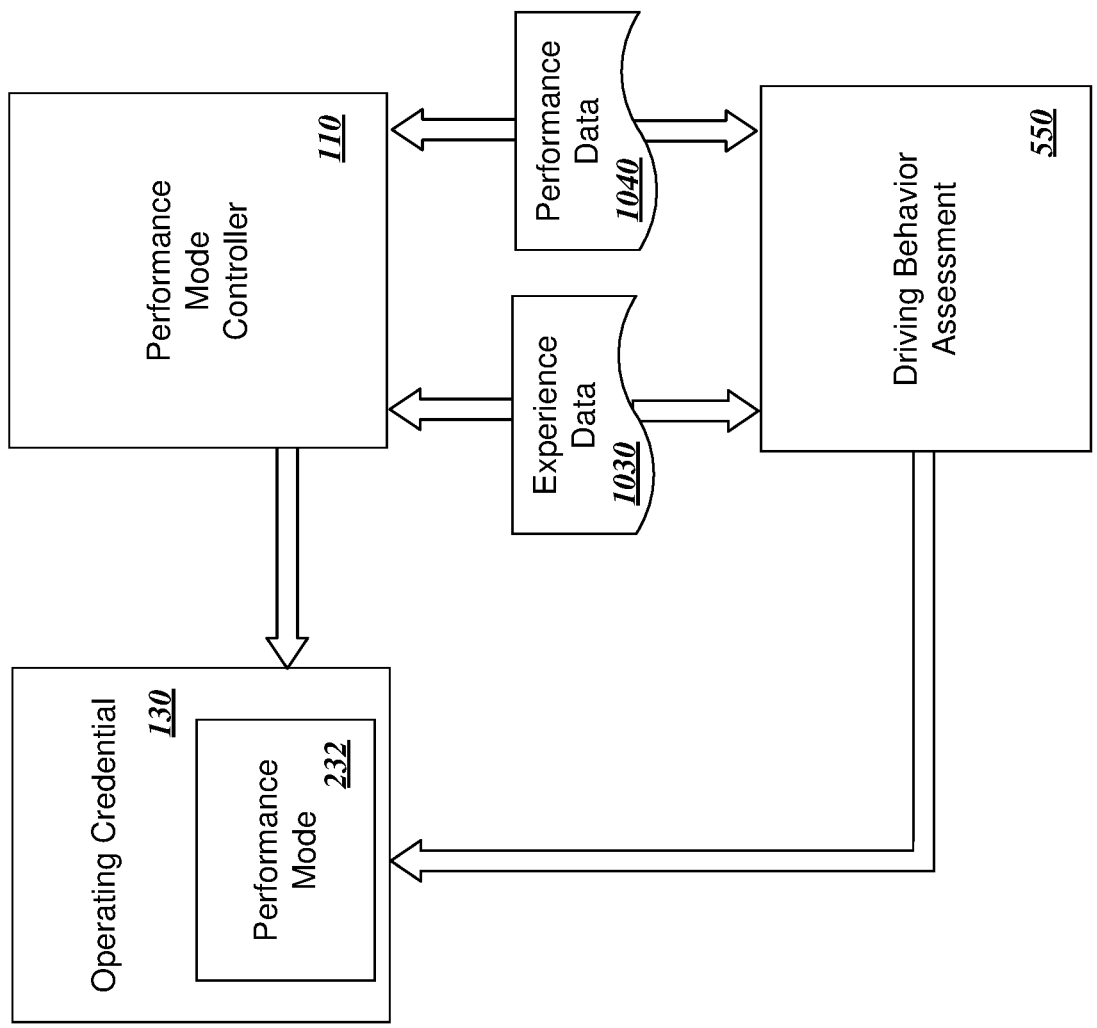
Figure 11:
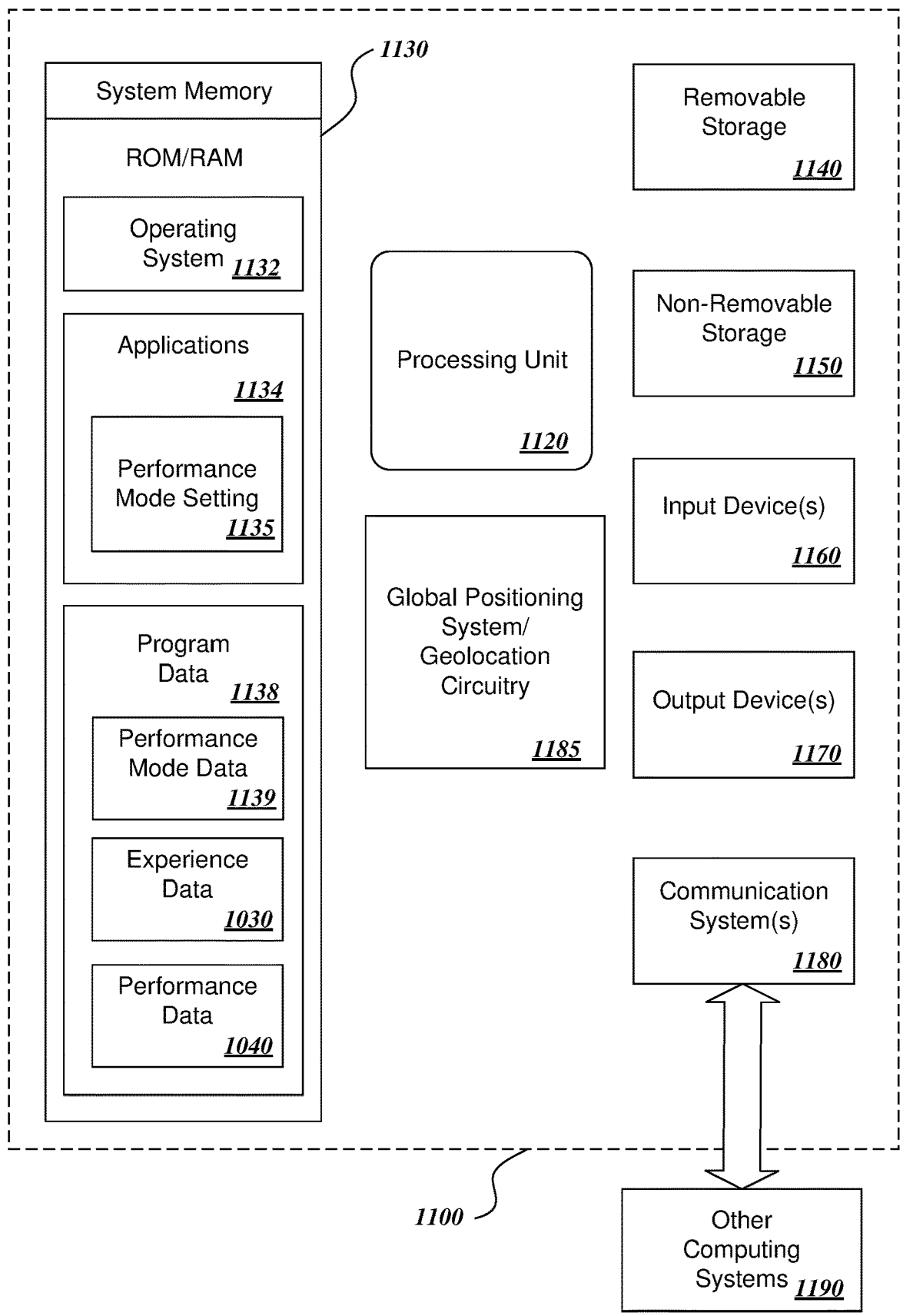
Figure 12:
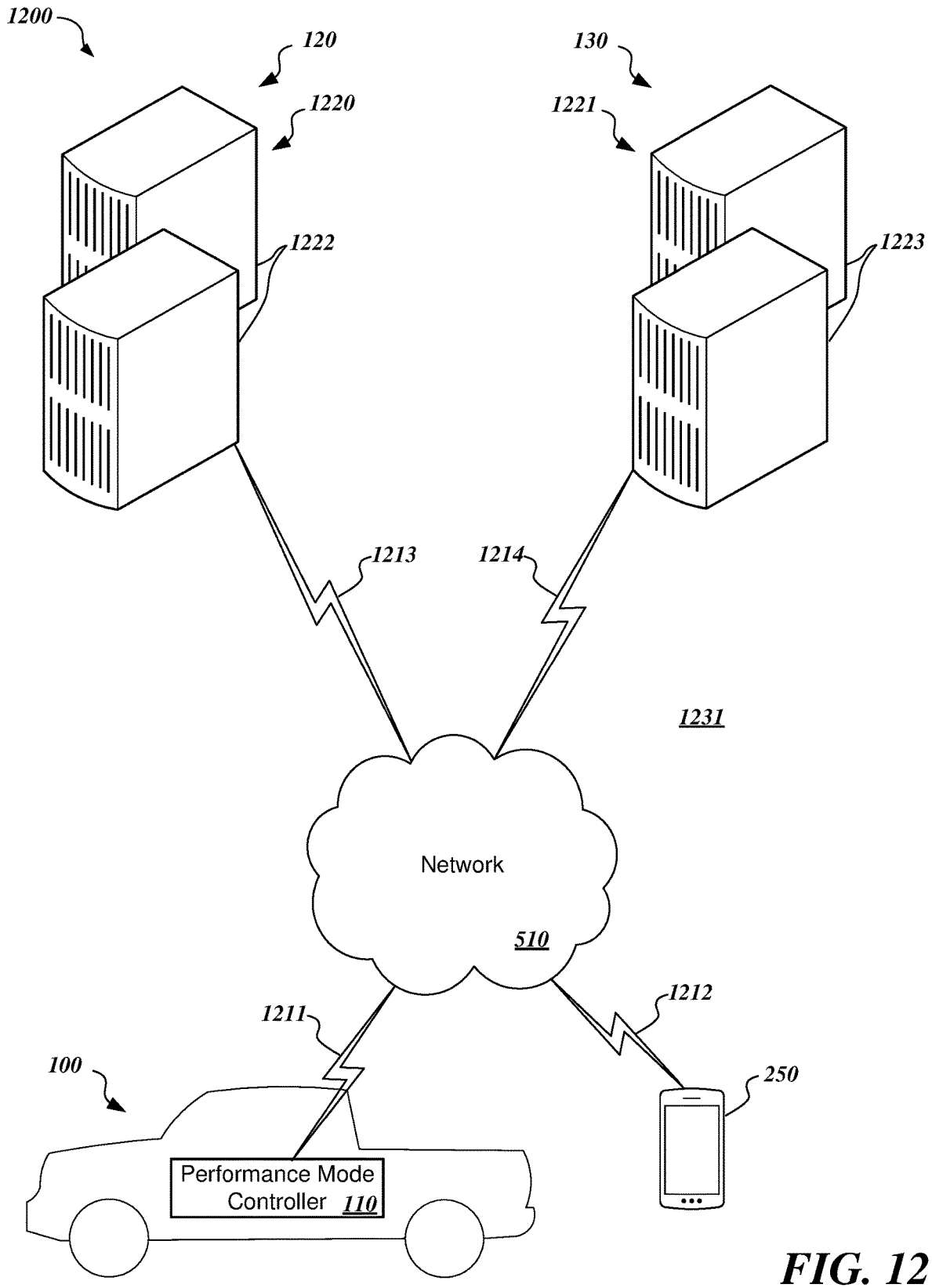
Figure 13:
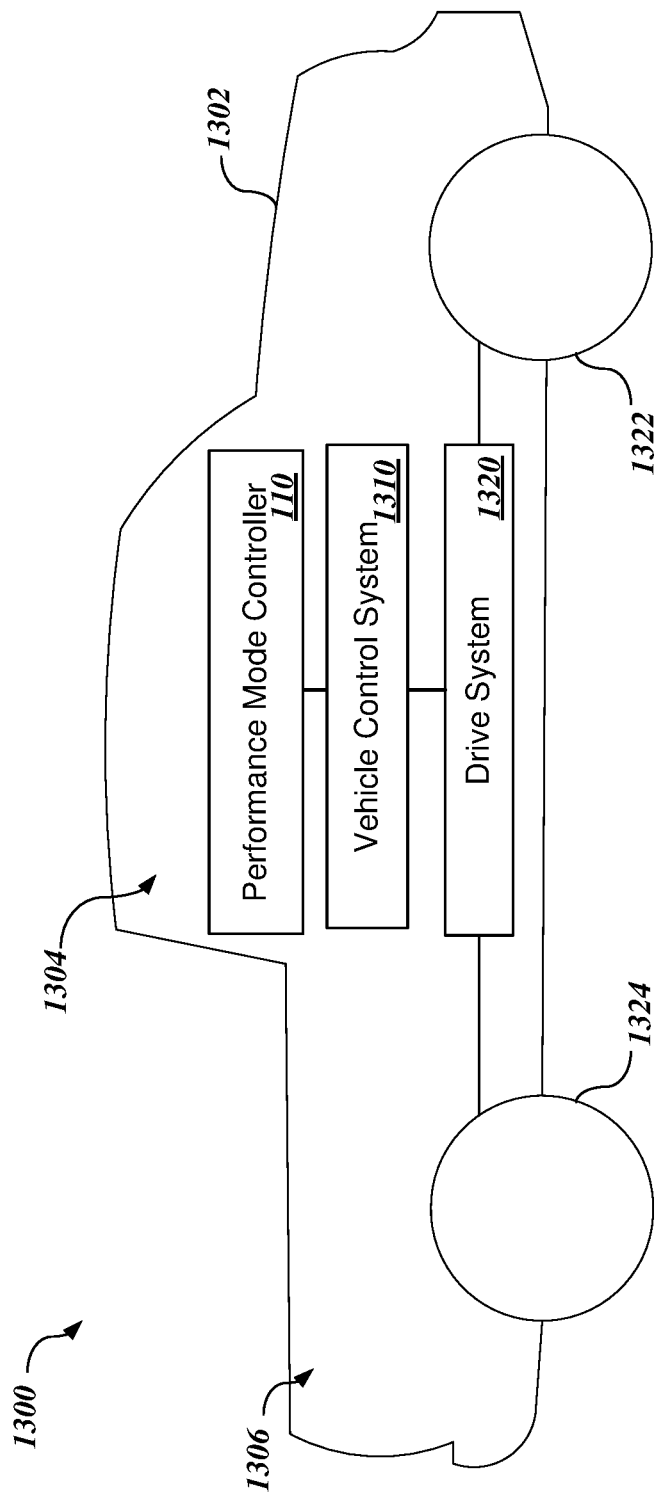
Figure 14:
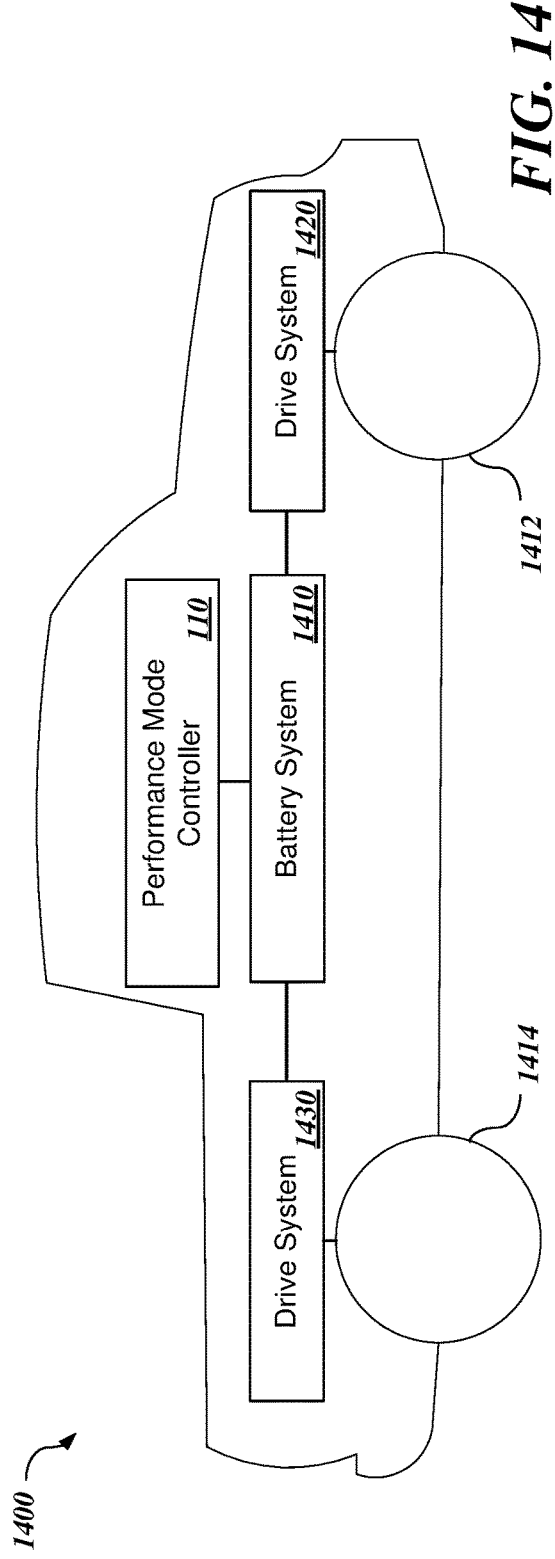
Figure 15:
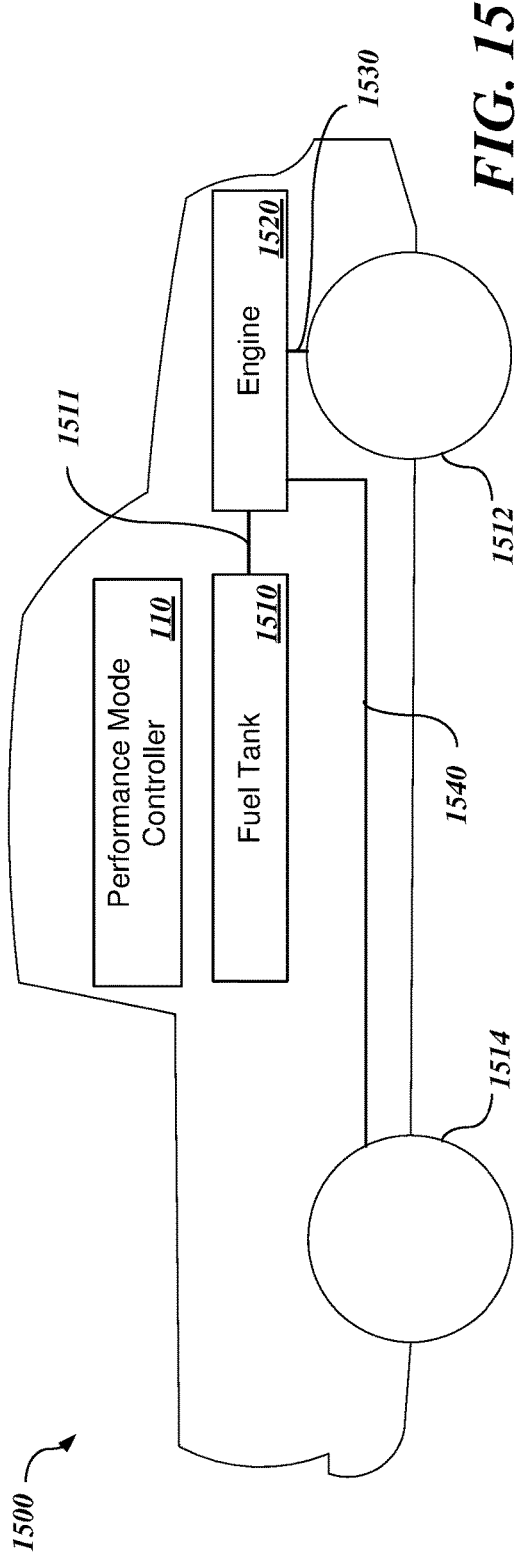
Figure 16:
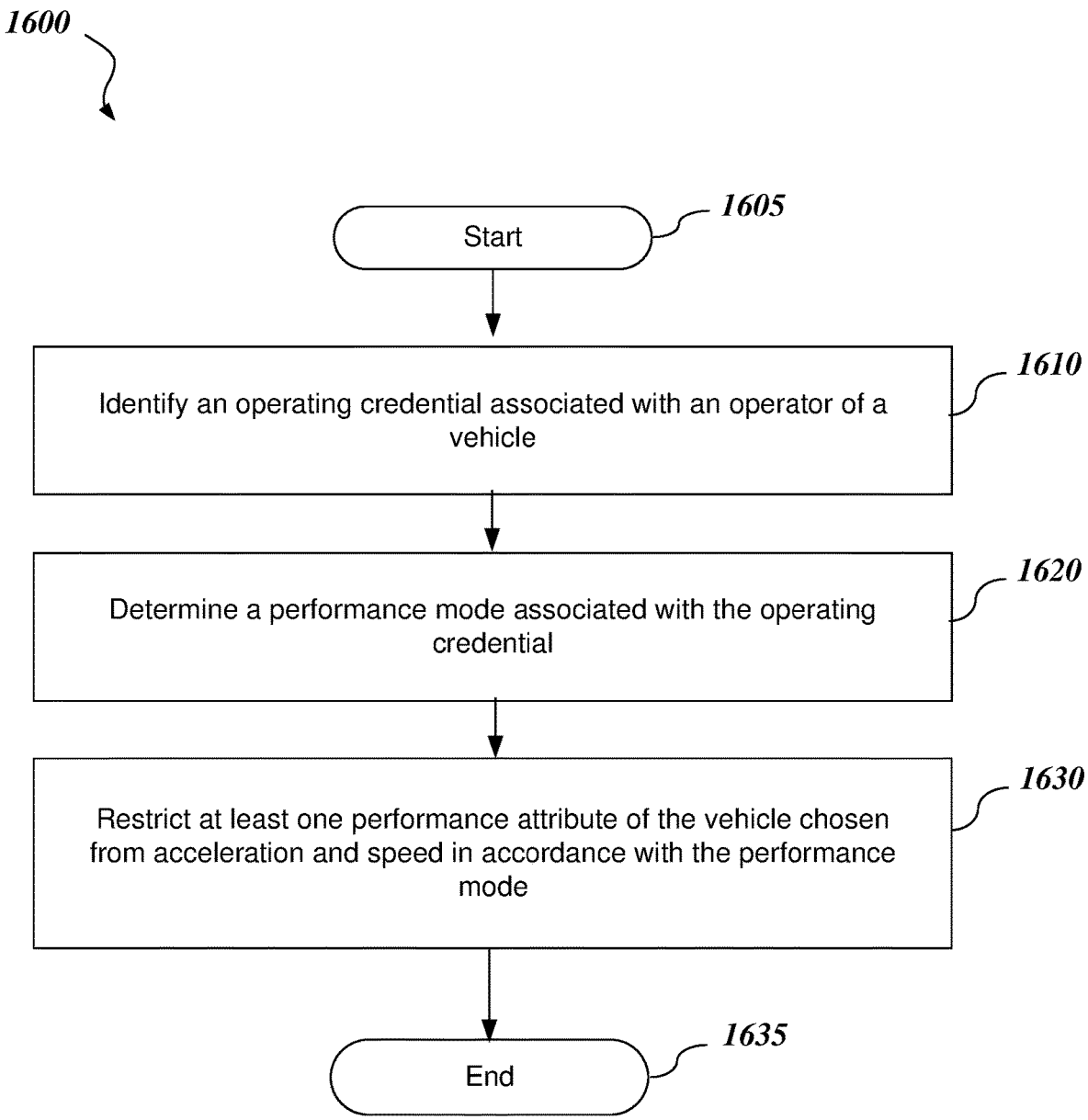

FIGS. 6, 7, 8, and 9 are block diagrams of an illustrative system and illustrative screen displays for setting performance modes;

FIG. 10 is a block diagram of a systems configured to automatically adjust the performance mode;

FIG. 11 is a block diagram of an illustrative computing system for performing functions of the performance mode controller and other systems in communication with the performance mode controller;

FIG. 12 is a block diagram of the performance mode controller of FIG. 1 communicating with one or more remote systems; and FIG. 13 is a block diagram in partial schematic form of an illustrative vehicle that includes the performance mode controller of FIG. 1;

FIGS. 14 and 15 are block diagrams in partial schematic form of an electrically-powered vehicle and an internal combustion engine-powered vehicle, respectively, that may be equipped with the performance mode controller of FIG. 1; and FIG. 16 is a flow chart of an illustrative method for selectively restricting a performance attribute of a vehicle for an operator or group of operators.

DETAILED DESCRIPTION

The following description explains, by way of illustration only and not of limitation, various embodiments.

By way of a non-limiting introduction and overview, in various embodiments a system includes a computing device that includes a processor and computer-readable media configured to store computer-executable instructions configured to cause the processor to: identify an operating credential associated with an operator of a vehicle; determine a performance mode associated with the operating credential; and restrict at least one performance attribute of the vehicle in accordance with the performance mode. By associating a performance mode with an operator via the operating credential, the performance mode can be set to limit a performance attribute of the vehicle, such as maximum acceleration or velocity. The performance mode for the operator thus can be reduced at a request of the operator, of a vehicle owner, or by an insurer, and the performance mode can be set based on preferences to restrict a performance mode to a reduced level based on the operator's experience level with the vehicle, the operator's driving behavior, or other factors. In various embodiments, the operator may choose to manually restrict a performance attribute, such as maximum speed or maximum velocity, as a measure of safety to reflect the operator's experience level or comfort level with the vehicle.

For the sake of illustration but not limitation, a problem may arise when a vehicle capable of a high acceleration may be driven by an operator who may not have experience with such a vehicle. When the operator presses the accelerator, the operator may be surprised by how rapidly the vehicle accelerates. Until the operator becomes used to a high acceleration, it may be desirable to set a performance mode to restrict the acceleration. Similarly, if an owner of the vehicle may wish set a performance mode for others who use the vehicle, either based on their user status (such as a fellow owner, a regular user such as a child, or a guest) or based on their individual identity. Each user may be provided with an operating credential, in the form of a key, key fob, or similar device, and the performance mode may be associated with the operating credential provided to each operator so that the performance mode for each operator will be applied when the operator presents the operating credential to use the vehicle.

In addition, the performance mode may be set remotely by other persons or entities. For example, an insurer that is providing coverage for the operator may set the insurance rate or agree to provide the coverage for use of the vehicle based on limiting the performance mode for young drivers or drivers with a questionable driving record. The performance mode may be automatically adjusted over time after the operator has a chance to acclimate to the vehicle's performance and/or by driving safely. Now that a general overview has been given, details of various embodiments will be explained by way of non-limiting examples given by way of illustration only and not of limitation.

Referring to FIG. 1, a vehicle 100 includes a performance mode controller 110 coupled with the drive system 120 of the vehicle. In various embodiments, the performance mode controller 110 is responsive to input from an operator 131 and/or an operating credential 130, such as a key, key fob, a smartphone storing an authentication code, or a similar object by which an operator 131 is able to demonstrate the operator's authorization to use the vehicle 100. It will be appreciated that the performance mode controller 110 may be a separate apparatus or the performance mode controller 110 may be incorporated in a vehicle control system, as further described below with regard to FIG. 11.

Figure 2:
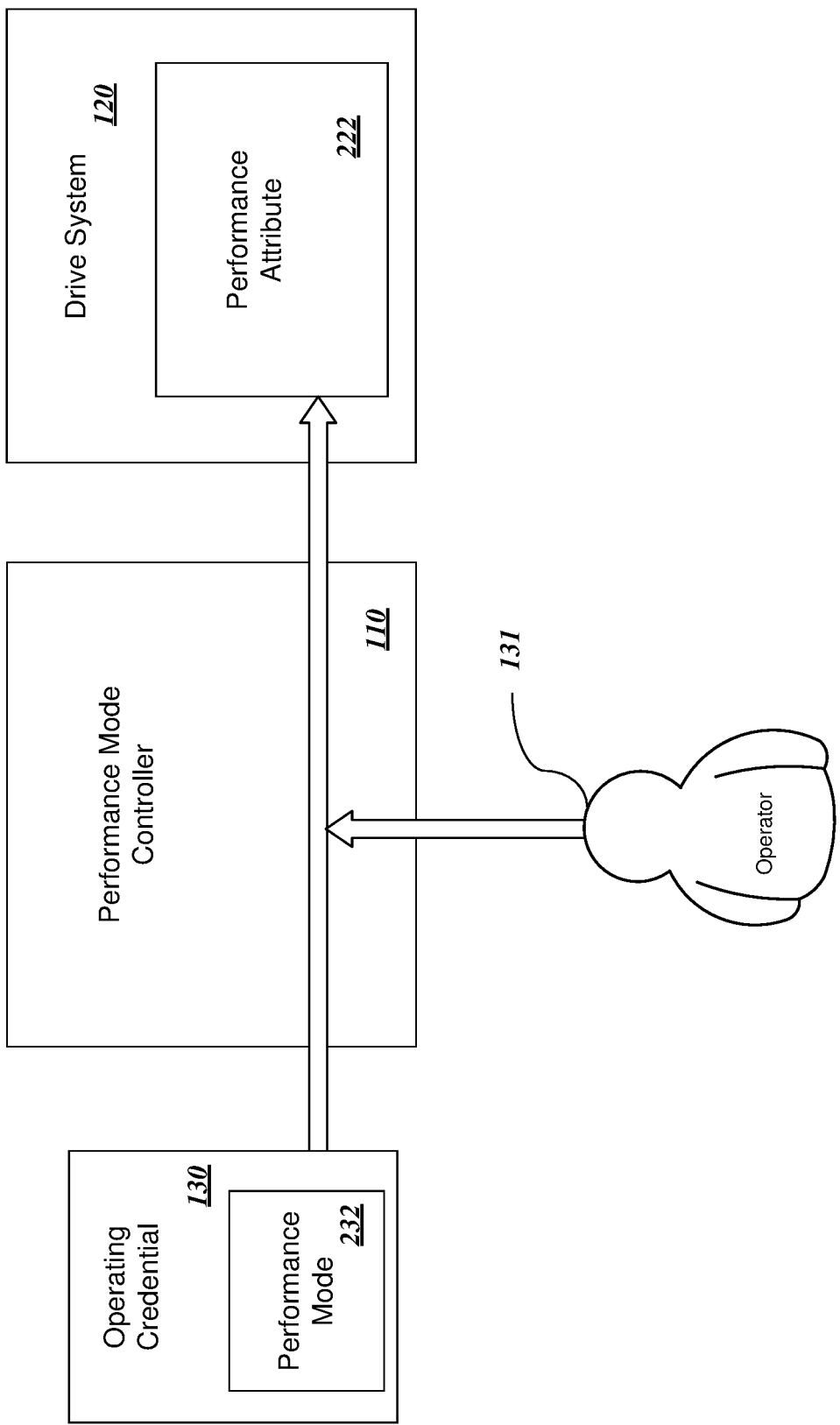
FIG. 2 is a block diagram of the performance mode controller of FIG. 1 determining a performance mode associated with an operating credential.

Referring additionally to FIG. 2, the operating credential 130 is associated with a performance mode 232. The performance mode 232 may be stored in the operating credential 130 or the performance mode controller 110 may be able to retrieve the performance mode 232 associated with the operating credential 130 from a system on board the vehicle 100 or accessible over a network, as further described below. When the operating credential 130 is presented by the operator 131 in order to operate the vehicle 100, the performance mode controller 110 examines the performance mode 232 and sets a performance attribute 222 of the drive system 120. In various embodiments, the performance mode 232 is used to restrict the performance attribute 222. In various embodiments, the performance attribute 222 may restrict a maximum acceleration or velocity below a maximum level 131 in order to prevent injuries to the operator, passengers, other people and/or to prevent damage to the vehicle 100 or other property, and/or to honor restrictions placed on use of the vehicle 100 by a designated owner, an insurer, or another person or entity. The designated owner may include a legal owner (by purchase or lease, for example) or a person within an organization who is designated at the vehicle's owner for controlling the operation of the vehicle. In various embodiments, the performance attribute 222 associated with the operating credential 130 may mandate the use of automated driving or autosteering features as a condition of the operator's use of the vehicle 100, as further described below.

Figure 3:
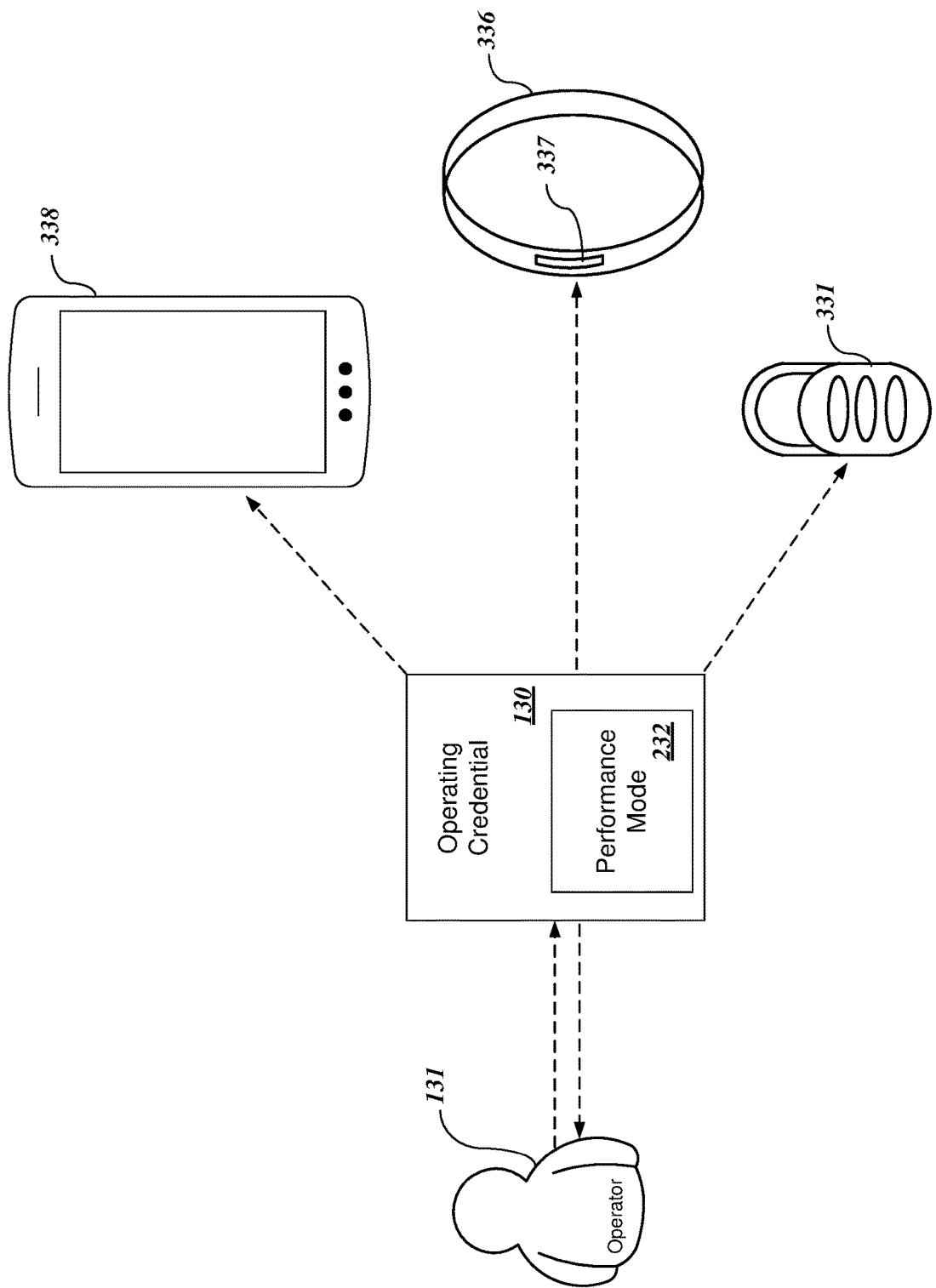
FIG. 3 is a block diagram of various forms of operating credentials usable with the performance mode controller of FIG. 1.

Referring additionally to FIG. 3, the operating credential 130 may include any number of objects from which authorization of the operator 131 can be verified. In various embodiments, the operating credential 130 may be a key or key fob 331 including a readable device such as a radio frequency identification (RFID) tag or a transmitter to communicate with the vehicle 100 and/or the performance mode controller 110. In various embodiments, the operating credential 130 may be a wearable device, such as a wristband 336 that includes an RFID tag 337 or other mechanism to communicate with the vehicle 100 and/or the performance mode controller 110. In various embodiments, the operating credential 130 also may be a smartphone 338 or other electronic device to communicate with the vehicle 100 and/or the performance mode controller 110. In addition, in various embodiments, the operating credential may be associated with the person of the operator 131 when the vehicle 100 is configured to verify the identity of the operator 131 from fingerprint verification, voice authentication, or facial recognition. In such cases, it will be appreciated that the performance mode 232 necessarily will have to be accessed from another system in which the performance mode is associated with the operator 131.

Figure 4:
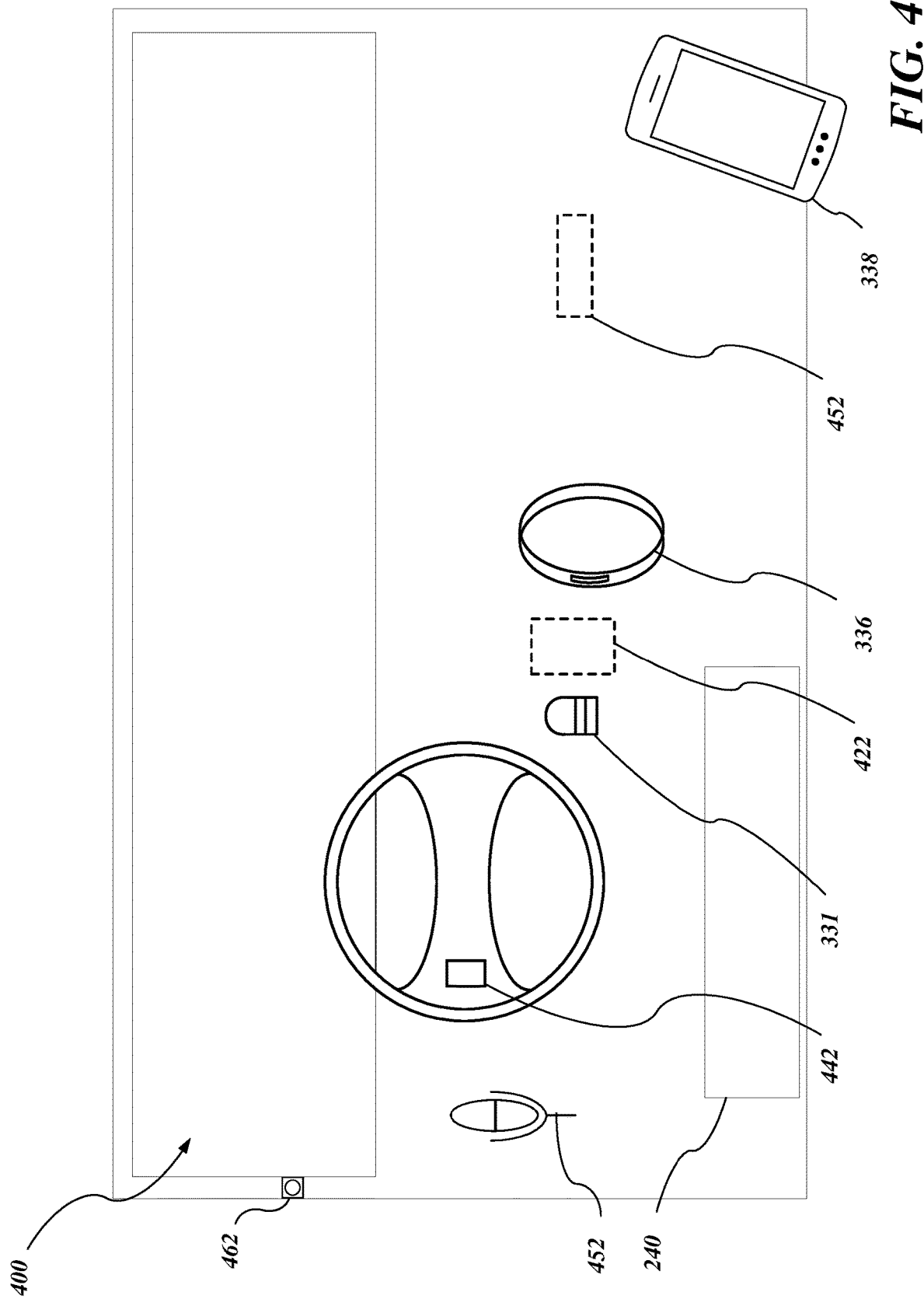
FIG. 4 is a perspective view of a cabin of a vehicle configured to verify operating credentials of FIG. 3.

Referring additionally to FIG. 4, the operating credential 130 may be presented and verified in a number of ways. In various embodiments, a cabin 400 of the vehicle includes a receiver or reader 422 to receive signals from or read the key/key fob 331 and/or the wearable device 336 to verify the operating credential 130 associated therewith. In various embodiments, the cabin 400 may include a transceiver 452 to exchange information with the smartphone 338 to verify the operating credential 130 associated therewith.

In various embodiments, the vehicle 100 is configured to verify the operating credential 130 directly from the person of the operator 131 with a fingerprint reader 442 to verify a fingerprint of the operator 131. In various embodiments, a microphone 452 may be included to perform voice authentication to verify a voice pattern of the operator 131. In various embodiments, a camera 462 may be included to perform facial recognition to verify a face of the operator 131. When the operating credential 130 is verified, the associated performance mode 232 may be applied to potentially restrict one or more performance attributes 222 of the vehicle 100.

Figure 5:
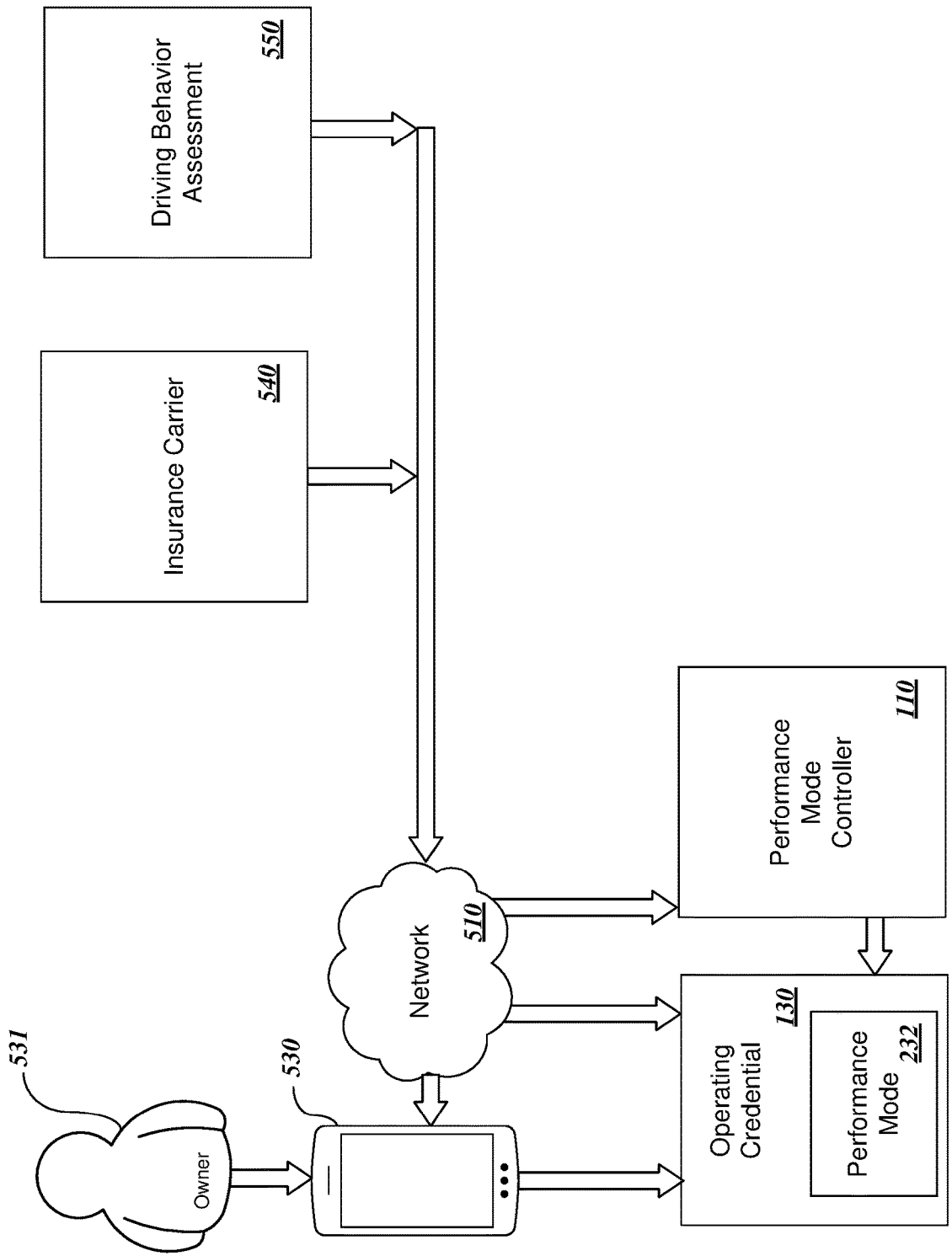
FIG. 5 is a block diagram of systems usable to set a performance mode.

Referring additionally to FIG. 5, the performance mode 232 for the operator 131, or any other operator or user of the vehicle 100, may be set in a number of ways and by a number of authorized persons or entities. In various embodiments, the performance mode 232 may be set directly with a computing device 530, such as a smartphone configured with an appropriate application to set the performance mode 232 in or associate the performance mode 232 with the operating credential 130. In various embodiments, the performance mode 232 may be set by an owner 531 (an actual owner or other designated owner, as previously described) of the vehicle 100. In this context, it will be appreciated that the owner 531 may include an actual owner of the vehicle 100 or an owner in the sense of having control over access to the vehicle 100, such as a fleet or vehicle pool manager.

In various embodiments, the performance mode 232 for the operating credential 130 may be set over a network 510. For example, the owner 531 can set or associate the performance mode 232 over the network 510 using the computing device 530. As a result, the owner 531 may be able to set or change the performance mode 232 remotely without having direct, local access to the operating credential 130.

In various embodiments, the performance mode 232 may be set by an insurance carrier 540. For the various types of operators that may use the vehicle 100, whether owners, regular users, or guests, the insurance carrier 540 may mandate a particular the performance mode 232 in order to manage risk that may result from use of the vehicle 100. In other words, a particular setting of the performance mode 232 (and a particular performance attribute 222 to restrict acceleration, velocity, or another attribute) may be a condition of the insurance carrier 540 to cover the use of the vehicle 100 by one or more operators.

In various embodiments, the performance mode 232 may be set by a driving behavior assessment system 550. The driving behavior assessment system 550 may monitor operation of the vehicle by one or more particular operators and specify the performance mode 232 based on the monitored driving behavior. For example, if the monitored driving behavior system 550 determines that a particular operator is driving safely at a particular setting of the performance mode 232, the performance mode 232 may be changed to provide the operator with access to greater acceleration. On the other hand, if the monitored driving behavior system 550 determines that a particular operator is not driving safely at a particular setting of the performance mode 232, the performance mode 232 may be changed to further restrict acceleration or another performance attribute 222. In various embodiments, the owner 531 (via the computing device 530), the insurance carrier 540, and the driving behavior assessment system 550 may communicate over the network 510 with the performance mode controller 110 or another vehicle system to set or change the performance mode 232 or to receive data about an operator's performance.

Figure 6:
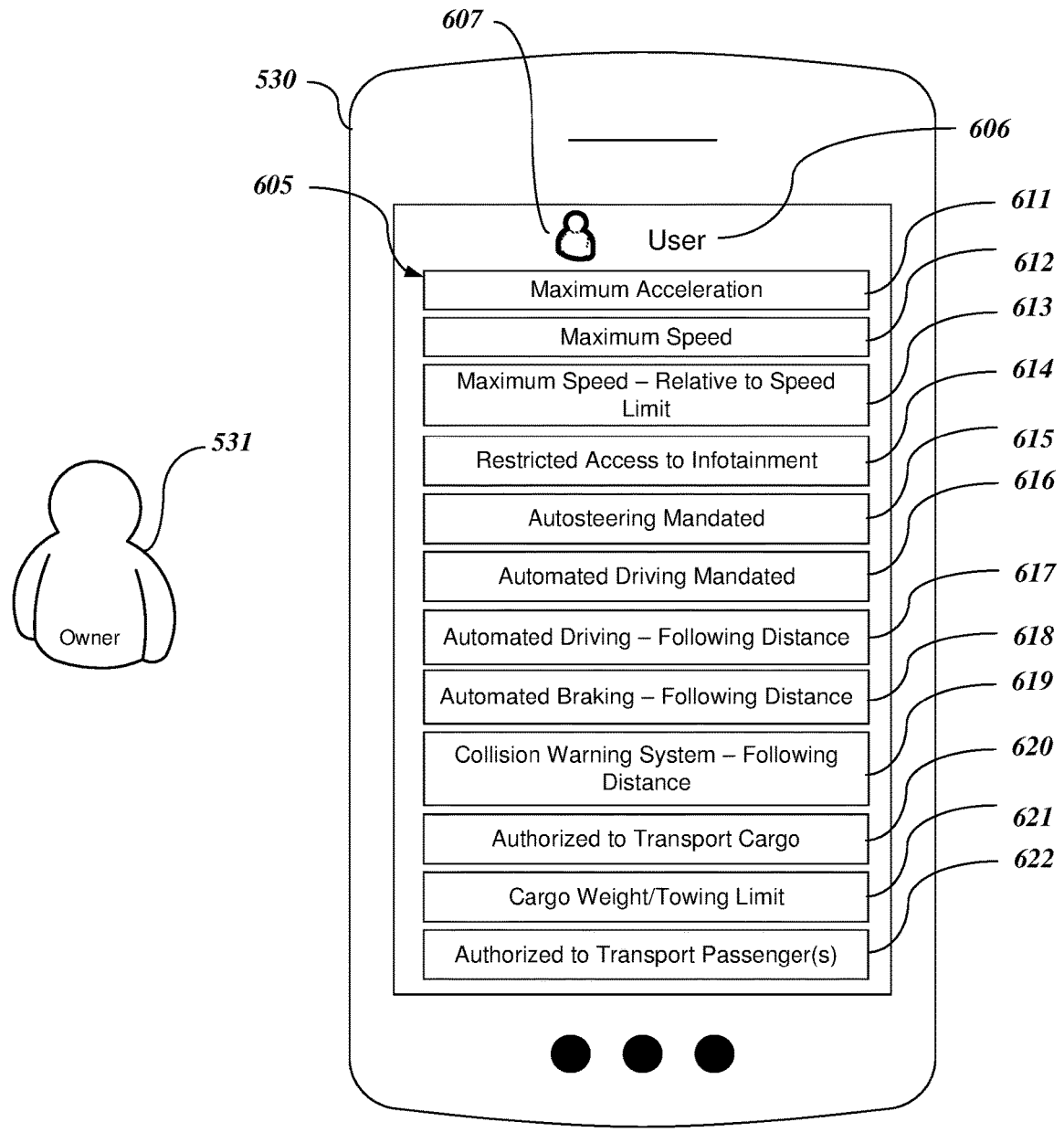

Referring additionally to FIG. 6, a list of performance attributes 605 may be provided an owner 531 (or other person authorized to set attributes). As further described below, the performance attributes 605 may be set for a particular user 606, type of user, or group of users. Individual users or types of users may be identified by name (instead of as "user" as shown in FIG. 6) and/or by an icon or image 607 that may include a photo of a particular user or a symbol indicative of a user type. As further described below, the type or user or group of users may be designated by an authorization level (such as an owner as opposed to an authorized user) or by an experience level or an organizational role designated or assigned within an organization.

In various embodiments, the list of performance attributes 601 may be presented as a menu on a presented via the computing device 530. In various embodiments, the performance attributes includes a maximum allowable acceleration 611, a maximum allowable speed 612, a maximum allowable speed relative to a speed limit 613, restricted access to infotainment systems 614, mandated use of autosteering 615, mandated use of automated driving 616, a minimum following distance for automated driving 617, an automated braking following distance 618 (before the braking system is activated), and a collision warning system following distance 619 (before an alarm is sounded).

In various embodiments, performance attributes may be associated with organizational roles or job descriptions that may be associated with particular users or groups of users. For example, an authorized to transport cargo attribute 620 may be associated with a user that is authorized to operate a vehicle carrying a load. Correspondingly, a cargo weight and/or towing attribute or attributes 621 may specify a load limit that the user 606 may be authorized to transport and/or whether the user 606 is authorized for towing a trailer or additional vehicle. A passenger authorization attribute 622 may be used to specify whether the user 606 is authorized to carry one or more passengers. It will be appreciated that sensors on the vehicle, such as weight sensors, sensors on the body operable to detect whether the vehicle is towing another body, and sensors in a passenger compartment, may be used to determine whether the vehicle carries a load, the weight of the load, the presence of a trailer, and the presence of one or more passengers to allow the attribute setting to be implemented. If the user 606 attempt to operate the vehicle in violation of the specified attributes, the performance mode controller 110 may prevent operation of the vehicle.

As a result, for example, the owner 531 may condition use of the vehicle 100 by the user 606 on the user employing autosteering or automated driving limit, control whether the user 606 may use infotainment systems aboard the vehicle 100, and/or, if the user 605 is permitted manual control of the vehicle 100, limit the acceleration and/or speed at which the vehicle 100 can be operated. Similarly, particular users or groups of users may be restricted from transporting cargo, transporting cargo over a certain weight, and/or from carrying passengers. The performance mode 232 (FIG. 2) may specify one or more performance attributes 605 that may restrict or control operation of the vehicle 100. The performance mode 232 may specify a single performance attribute 605 or may include multiple performance attributes 605.

Figure 7:
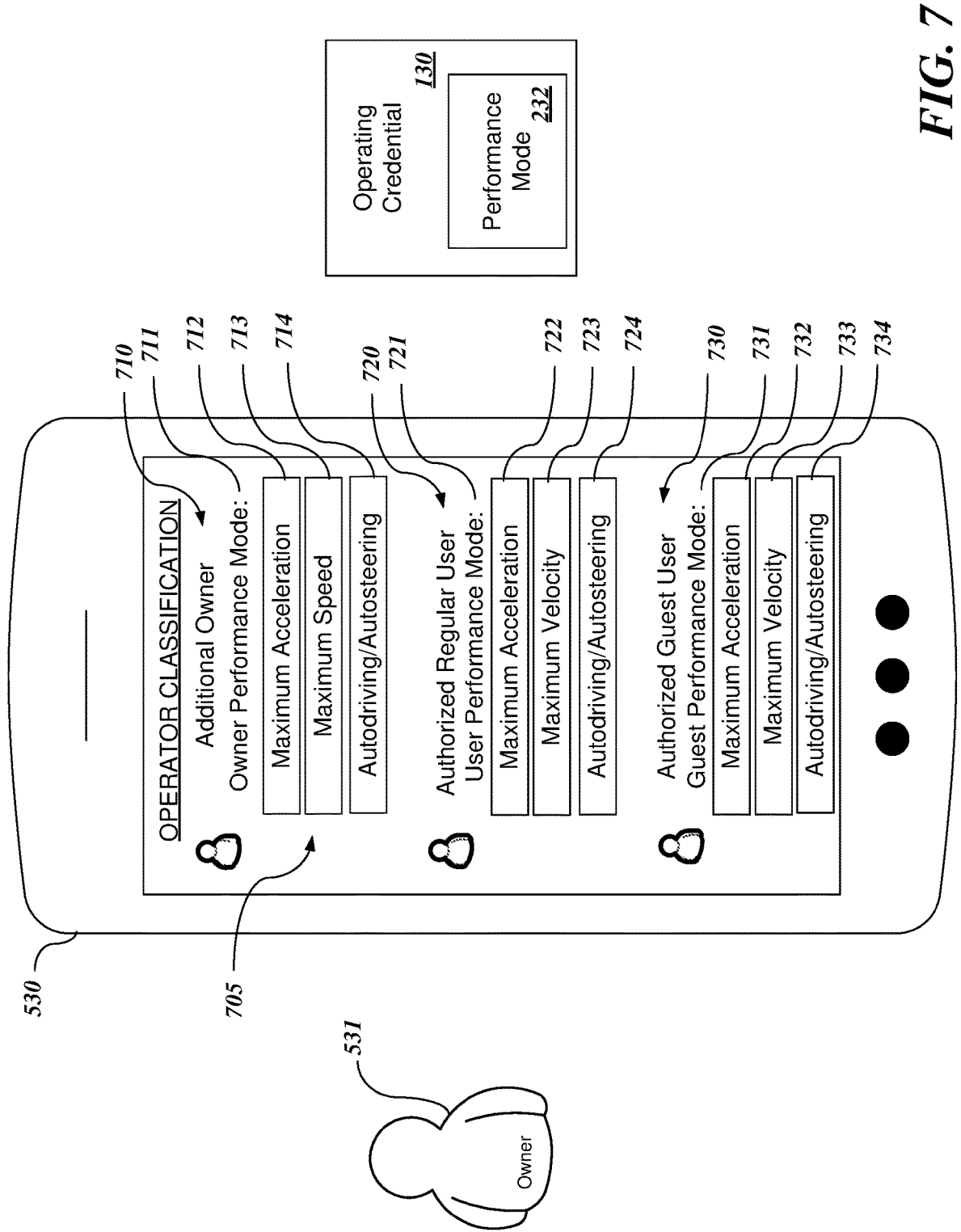

Referring additionally to FIG. 7, in various embodiments the owner 531 (the legal owner or person otherwise designated as the owner for control of the vehicle) may set the performance mode 232 for the operating credential 130 according to an operator classification representative of types of operators authorized to use the vehicle 100. In various embodiments, the operator classification may include different types of authorized users, including, for example, additional owners 710 (literal owners or persons with control of the vehicle 100, such as a vehicle fleet manager), authorized regular users 720 (e.g., user who regularly use the vehicle 100 as authorized by an owner 531), such as family members, coworkers, or employees, and authorized guest users 730 (such as those being permitted single or otherwise limited ad hoc use of the vehicle). In addition, the operator classification may reflect an organizational role or job description of the operator. For example, and as described further below, the performance mode 232 may be associated with an operator who is designated as being a cargo driver, a courier, or having another organizational role, and the performance attributes of the associated performance mode may be set in accordance with the organizational role or job description.

In various embodiments, the performance mode 232 (FIG. 2) may specify one or more performance attributes 705 that may restrict or control operation of the vehicle 100 with regard to a particular user or operator classification The performance mode 232 may specify a single performance attribute 705 for a particular user or operator classification or may include multiple performance attributes 705 for a particular user or operator classification.

In various embodiments, for the additional owners 710, an owner performance mode 711 may include one or more performance attributes 705 including a maximum acceleration 712 and a maximum velocity 713 (including an overall velocity and/or a maximum velocity relative to a speed limit for a road being traveled). The owner performance mode 611 also may specify a performance attribute 705 as to whether automated driving (or "autodriving") or autosteering 714 is mandated to use the vehicle 100. The performance attribute 705 also may restrict access to infotainment controls, or specify a greater following distance to be used by forward collision warning or autobraking systems, or similar parameters. For the authorized regular users 720, a user performance mode 721 may include a different or same maximum acceleration 722 and a maximum velocity 723. The user performance mode 721 also may specify a performance attribute as to whether autodriving or autosteering 724 is mandated for the regular user to use the vehicle 100. For the authorized guest users 730, a guest performance mode 731 may include a different or same maximum acceleration 732 and a maximum velocity 733. The owner performance mode 731 also may specify a performance attribute as to whether autodriving or autosteering 734 is mandated for the authorized guest to use the vehicle 100.

In various embodiments the performance modes 711, 721, and 731 all may be different. For example, for the authorized guest users 730, although they may be authorized, guest users may have a lowest level of vehicle familiarity and/or may be least likely to be covered by the owner's insurance for the vehicle 100. Accordingly, the owner 531 may wish to set the performance attributes 732 and 733 to restrictive levels for the authorized guest users 630. It will be appreciated that, if the vehicle 100 is part of a fleet, an ability to set the performance mode 232 for groups of users 710, 720, and 730 would simplify a task of setting the performance mode 232 for users across the fleet.

Figure 8:
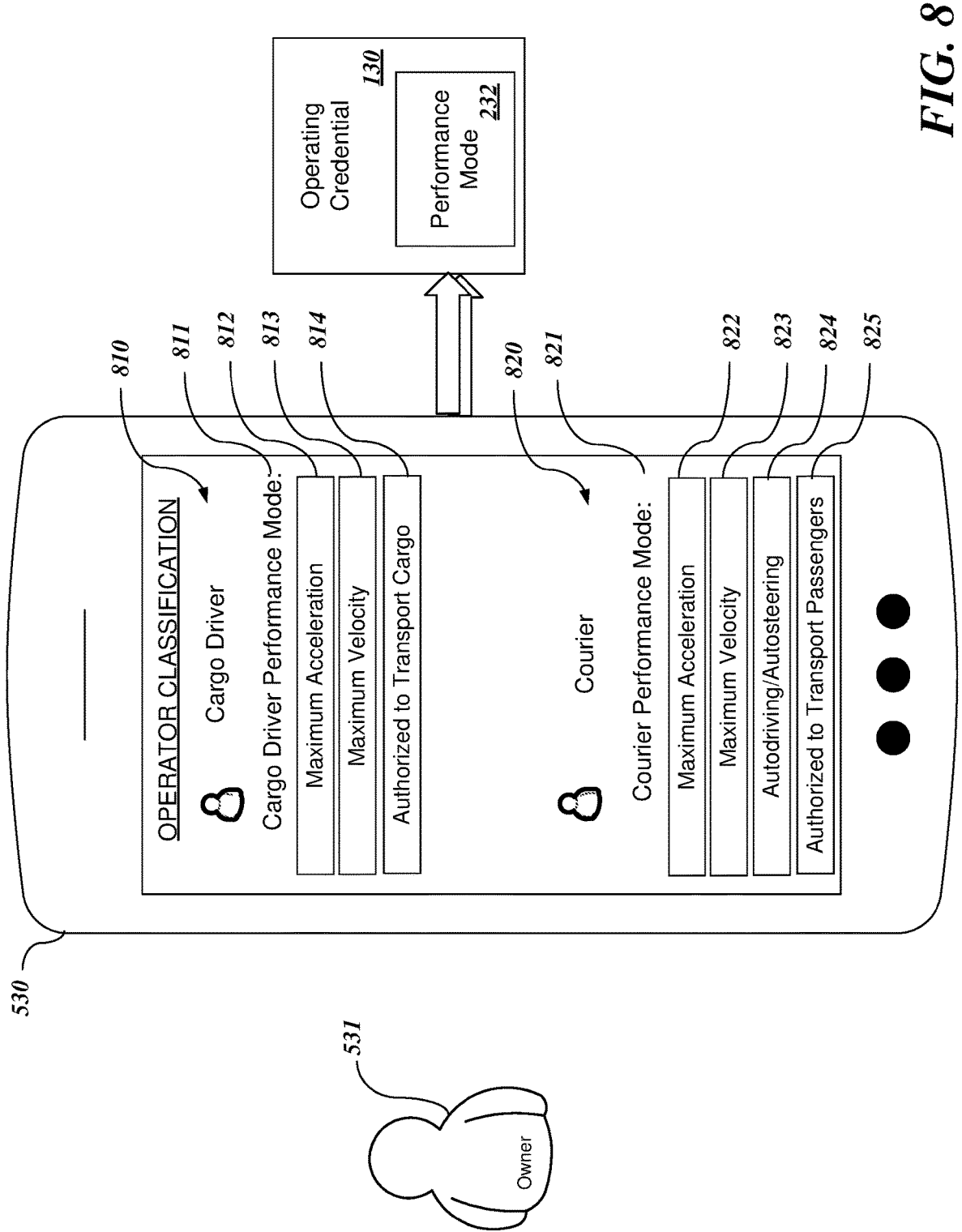

Referring additionally to FIG. 8, in various embodiments, the owner may set the performance mode 232 for types or groups of users according to the users' organizational role or job description. For example, a user designated as a cargo driver 810 (whose organizational role or job description may be associated with their operating credential 130 as described with reference to FIGS. 1 and 3) may be associated with a particular performance mode 232. A cargo driver performance mode 811 may specify a maximum acceleration 812 and maximum velocity 813 determined to be suitable for someone authorized to carry cargo, the authority to do which is specified by an authorized to transport cargo attribute 814. As previously described with reference to FIG. 6, sensors on the vehicle may determine the load condition of the vehicle so that one who is not authorized to transport cargo will be unable to operate the vehicle. At the same time, the cargo driver performance mode 811 may not include the attribute that the cargo driver 810 is permitted to carry passengers, so the performance mode controller 110 may prevent operation of the vehicle if the cargo driver 810 attempts to carry a passenger.

By comparison, a user designated as a courier 820 (whose organizational role or job description may be associated with their operating credential 130 as described with reference to FIGS. 1 and 3) may be associated with a particular performance mode 232. A courier performance mode 811 may specify a maximum acceleration 822 and maximum velocity 823 determined to be suitable for a courier and that may, for example, exceed the maximum acceleration 812 and maximum velocity 813 permitted for the cargo driver 811. However, the courier performance mode 820 may mandate the user of autodriving or autosteering 824. The courier performance mode 820 also may not include the authorized to transport cargo attribute 814, thus, the courier 820 may carry cargo in excess of a specified threshold weight limit. On the other hand, the courier performance mode 821 may include the authorized to transport passengers attribute 825 to enable the courier 820 to transport one or more passengers. Thus, various embodiments may allow control over users not only based on they are an authorized user of a various types, but also based on the authorized users' roles.

Figure 9:
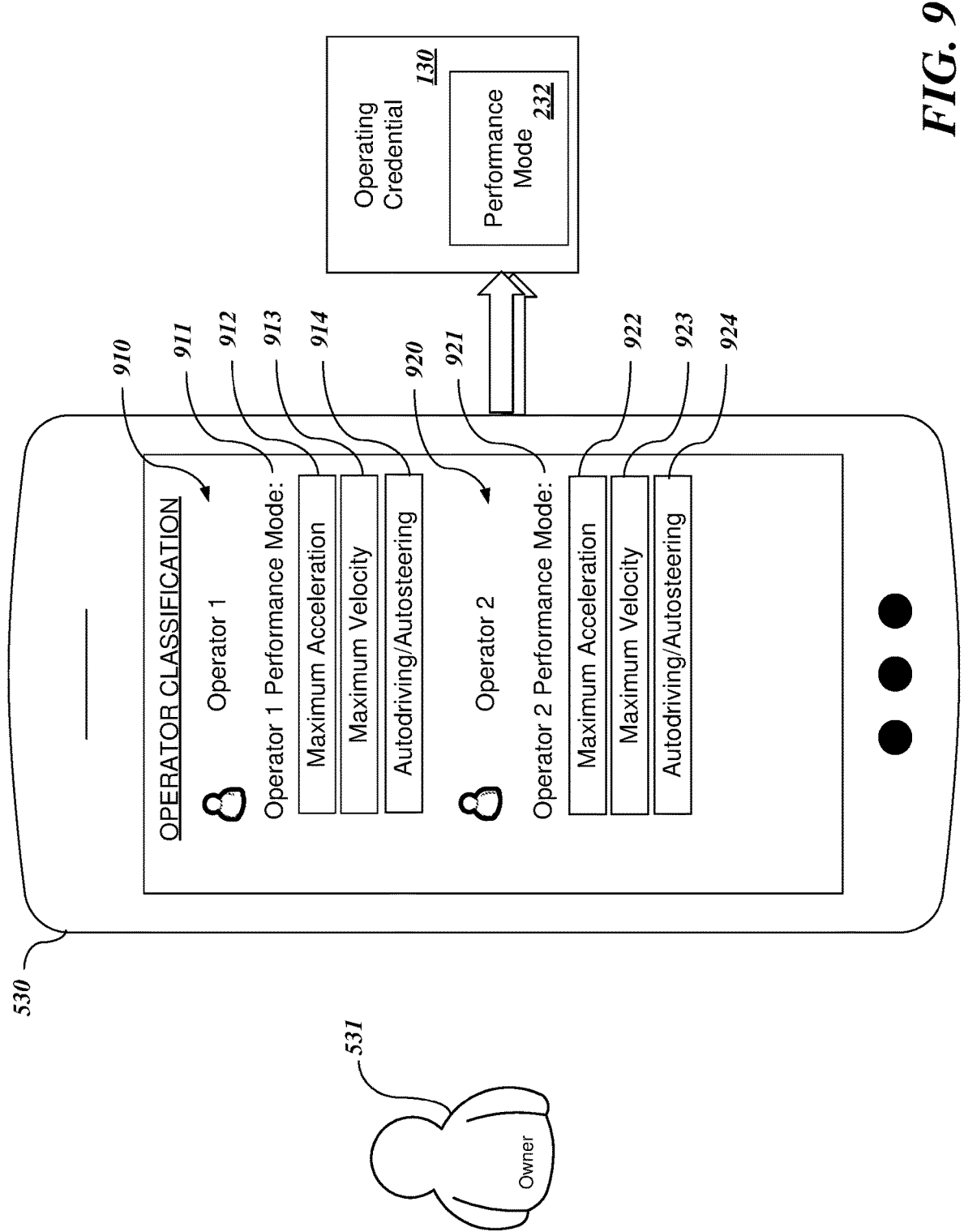

Referring additionally to FIG. 9, in various embodiments the owner 531 may set the performance mode 232 associated with the operating credential 130 of individual operators. For each of a number of authorized operators 910 and 920, the owner 531 may set the performance mode 911 and 921. For each individual operator 910 and 920, the owner 531 may set separate performance attributes 912, 913, 914, 922, 923, and 924. The performance attributes 912, 913, 914, 922, 923, and 924 may be set based on the personal knowledge of the owner regarding each of the operators 910 and 920. Similarly, for each of a number of authorized operators 910 and 920, the owner 531 may set the performance mode 911 and 921 to specify a performance attribute that includes mandated use of autodriving or autosteering 914 and 924, respectively. As a result, in various embodiments, the owner 531 has wide flexibility in being able to conveniently set the performance mode 232 for groups of users 710, 720, and 730 (FIG. 7) and 810 and 820 (FIG. 8) and the granularity to set the performance mode for individual operators 910 and 920.

Referring additionally to FIG. 9, in various embodiments the performance mode 232 is automatically adjustable based on an operator's experience level with the vehicle 100 and performance in using the vehicle 100. As previously described, a motivation in setting the performance mode 232 is that an operator who lacks familiarity with a vehicle 100 with high acceleration may have trouble controlling the vehicle 100 until the operator gains familiarity with the vehicle 100. However, with increasing experience with the vehicle, the performance mode 232 may be changed to allow the operator to take advantage of the capabilities of the vehicle 100 commensurate with the operator's experience level.

In various embodiments, the performance mode controller 110 or another system (such as the driving behavior assessment system 550), may monitor how much experience an operator associated with the operating credential 130 has gained with the vehicle 100. In various embodiments, experience data 930 representing the experience level of the operator may be stored and tracked by the performance mode controller 110 or the driving behavior assessment system 550. As the operator associated with the operating credential 130 amasses specified levels of experience with the vehicle, the performance mode controller 110 or the driving behavior assessment system 550 may change the performance mode 232 to reduce restrictions of one or more performance attributes 222. The performance mode 232 may be iteratively changed upon reaching different levels of experience.

In various embodiments, performance data 940 may be stored and tracked by the performance mode controller 110 or the driving behavior assessment system 550. In various embodiments, if the performance data 940 indicates that the operator associated with the operating credential 130 demonstrates careful driving with the vehicle 100, the performance mode controller 110 or the driving behavior assessment system 550 also may change the performance mode 232 to reduce restrictions of one or more performance attributes 222. On the other hand, if the operator's driving behavior is less than satisfactory, the performance mode 232 may be automatically changed to maintain or increase restriction of the performance attributes 222 specified by the performance mode 232 associated with the operating credential 130 for that operator.

Referring additionally to FIG. 11 and given by way of example only and not of limitation, in various embodiments the performance mode controller 110, the computing device 530, and other computing systems used by the insurance carrier and the driving behavior assessment system 550 include a general purpose computing device 1100 operated according to computer-executable instructions to cause the computing device 110 to set performance modes 232 as previously described. The computing device 1100 typically includes at least one processing unit 1120 and a system memory 1130. Depending on the configuration and type of computing device, the system memory 1130 may include volatile memory, such as random-access memory ("RAM"), non-volatile memory, such as read-only memory ("ROM"), flash memory, and the like, or a combination of volatile memory and non-volatile memory. The system memory 1130 typically maintains an operating system 1132, one or more applications 1134, and program data 1138. The operating system 1132 may include any number of operating systems executable on desktop or portable devices including, but not limited to, Linux, Microsoft Windows®, Apple IOS®, or Android®, or a proprietary operating system. The applications 1134 may include an embodiment of an application 1135 for setting a performance mode as herein described. The program data 1138 may include performance mode data 1139, experience data 1030 (FIG. 10), and performance data 1040 (FIG. 10), as previously described.

The computing device 1100 may also have additional features or functionality. For example, the computing device 1100 may also include additional data storage devices (removable and/or non-removable) such as, for example, magnetic disks, optical disks, tape, or flash memory. Such additional storage devices are illustrated in FIG. 11 by removable storage 1140 and non-removable storage 1150. Computer storage media may include volatile and non-volatile, removable and non-removable media implemented in any method or technology for storage of information, such as computer-readable instructions, data structures, program modules or other data. The system memory 1130, the removable storage 1140, and the non-removable storage 1150 are all examples of computer storage media. Available types of computer storage media include, but are not limited to, RAM, ROM, EEPROM, flash memory (in both removable and non-removable forms) or other memory technology, CD-ROM, digital versatile disks (DVD) or other optical storage, magnetic cassettes, magnetic disk storage or other magnetic storage devices, or any other medium which can be used to store the desired information and which can be accessed by the computing device 1100. Any such computer storage media may be part of the computing device 1100.

The computing device 1100 may also have input device(s) 1160 such as a keyboard, stylus, voice input device, touchscreen input device, etc. Output device(s) 1170 such as a display, speakers, short-range transceivers such as a Bluetooth transceiver, etc., may also be included. The computing device 1100 also may include one or more communication systems 1180 that allow the computing device 1100 to communicate with other computing systems 1190, such as those described with reference to FIG. 5 and further described below with reference to FIG. 12. As previously mentioned, the communication system 1180 may include systems for wired or wireless communications. Available forms of communication media typically carry computer-readable instructions, data structures, program modules or other data in a modulated data signal such as a carrier wave or other transport mechanism and includes any information delivery media. The term "modulated data signal" may include a signal that has one or more of its characteristics set or changed in such a manner as to encode information in the signal. By way of illustrative example only and not of limitation, communications media may include wired media such as a wired network or direct-wired connection, and wireless media such as acoustic, radio frequency (RF), infrared and other wireless media. The term computer-readable media as used herein includes both storage media and communication media.

In further reference to FIG. 11, the computing device 1100 may include the location system/circuitry 1185, which may include global positioning system ("GPS") and/or geolocation circuitry that can automatically discern its location based on relative positions to multiple GPS satellites or other signal sources, such as cellphone towers or other signal sources. The location system/circuitry 1185 may be used to track location and movement of a vehicle which may be used in evaluating operator performance.

As previously described with reference to FIG. 5, in addition to one or more onboard computing systems, various embodiments may communicate with remote computing systems to perform the functions herein described. Referring to FIG. 12, an operating environment 1200 may include one or more sets of remote computing systems 1220 and 1221. It will be appreciated that the remote computing systems 1220 and 1221 may each include one or more computing devices 1222 and 1223 that may reside at one or more locations. In various embodiments, the remote computing systems 1220 and 1221 each may include a server or server farm. The remote computing systems 1220 and 1221 may represent systems used by the insurance carrier 540 and the driving behavior assessment system 550 (FIG. 5) to set the performance mode 232 as previously described. In various embodiments, the remote computing systems 1220 and 1221, the performance mode controller 110 associated with the vehicle 100, and the computing device 530 communicate via the network 510 over wired and/or wireless communications links 1211-1214.

Referring additionally to FIG. 13, in various embodiments a vehicle 1300 includes the performance mode controller 110. In various embodiments, the performance mode controller 110 may be engaged or combined with a vehicle control system 1310 that controls operation of the vehicle 1300. In various embodiments, the vehicle 1300 includes a body 1302 that may include a cabin 1304 capable of accommodating an operator, one or more passengers, and/or cargo and a cargo area 1306 separate from the cabin 1304, such as a trunk or a truck bed, capable of transporting cargo. The vehicle 1300 includes a drive system 1320, as further described below, which is selectively engageable with one or more front wheels 1322 and/or one or more rear wheels 1324 to motivate, accelerate, decelerate, stop, and steer the vehicle 1300.

Referring additionally to FIG. 14, the performance mode controller 110 may be used with an electrically-powered vehicle 1400. The wheels 1412 and/or 1414 may be motivated by one or more electrically-powered drive systems 1420 and/or 1430, such as motors, operably coupled with the wheels 1412 and/or 1414. The drive systems 1420 and 1430 draw power from a battery system 1410, which also may be used to power the performance mode controller 110.

Referring additionally to FIG. 15, the performance mode controller 110 may be used with an internal combustion engine-powered vehicle 1500. The wheels 1512 and/or 1514 may be motivated by an internal combustion or hybrid engine 1520 coupled with a fuel tank 1510 via a fuel line 1511. The engine 1520 may be coupled to the wheels 1512 and/or 1514 by mechanical linkages 1530 and 1540, respectively, including axles, transaxles, or other drive train systems to provide rotational force to power the wheels 1512 and/or 1514. It will be appreciated that FIGS. 13-15 show four-wheeled land vehicles. However, as previously mentioned, it will be appreciated that the system 100 may be integrated with other land vehicles, aircraft, or marine craft.

Referring to FIG. 16, an illustrative method 1600 is provided for selectively restricting a performance attribute of a vehicle for an operator or group of operators. The method 1600 starts at a block 1605. At a block 1610, an operating credential associated with an operator of a vehicle is identified. At a block 1620, a performance mode associated with the operating credential is determined. At a block 1630, at least one performance attribute of the vehicle is restricted, where the at least one performance attribute is chosen from acceleration and speed in accordance with the performance mode. The method 1600 ends at a block 1635.

Those skilled in the art will recognize that at least a portion of the devices and/or processes described herein can be integrated into a data processing system. Those having skill in the art will recognize that a data processing system generally includes one or more of a system unit housing, a video display device, memory such as volatile or non-volatile memory, processors such as microprocessors or digital signal processors, computational entities such as operating systems, drivers, graphical user interfaces, and applications programs, one or more interaction devices (e.g., a touch pad, a touch screen, an antenna, etc.), and/or control systems including feedback loops and control motors (e.g., feedback for sensing position and/or velocity; control motors for moving and/or adjusting components and/or quantities). A data processing system may be implemented utilizing suitable commercially available components, such as those typically found in data computing/communication and/or network computing/communication systems.

The term module, as used in the foregoing/following disclosure, may refer to a collection of one or more components that are arranged in a particular manner, or a collection of one or more general-purpose components that may be configured to operate in a particular manner at one or more particular points in time, and/or also configured to operate in one or more further manners at one or more further times. For example, the same hardware, or same portions of hardware, may be configured/reconfigured in sequential/parallel time(s) as a first type of module (e.g., at a first time), as a second type of module (e.g., at a second time, which may in some instances coincide with, overlap, or follow a first time), and/or as a third type of module (e.g., at a third time which may, in some instances, coincide with, overlap, or follow a first time and/or a second time), etc. Reconfigurable and/or controllable components (e.g., general purpose processors, digital signal processors, field programmable gate arrays, etc.) are capable of being configured as a first module that has a first purpose, then a second module that has a second purpose and then, a third module that has a third purpose, and so on. The transition of a reconfigurable and/or controllable component may occur in as little as a few nanoseconds, or may occur over a period of minutes, hours, or days.

In some such examples, at the time the component is configured to carry out the second purpose, the component may no longer be capable of carrying out that first purpose until it is reconfigured. A component may switch between configurations as different modules in as little as a few nanoseconds. A component may reconfigure on-the-fly, e.g., the reconfiguration of a component from a first module into a second module may occur just as the second module is needed. A component may reconfigure in stages, e.g., portions of a first module that are no longer needed may reconfigure into the second module even before the first module has finished its operation. Such reconfigurations may occur automatically, or may occur through prompting by an external source, whether that source is another component, an instruction, a signal, a condition, an external stimulus, or similar.

For example, a central processing unit of a personal computer may, at various times, operate as a module for displaying graphics on a screen, a module for writing data to a storage medium, a module for receiving user input, and a module for multiplying two large prime numbers, by configuring its logical gates in accordance with its instructions. Such reconfiguration may be invisible to the naked eye, and in some embodiments may include activation, deactivation, and/or re-routing of various portions of the component, e.g., switches, logic gates, inputs, and/or outputs. Thus, in the examples found in the foregoing/following disclosure, if an example includes or recites multiple modules, the example includes the possibility that the same hardware may implement more than one of the recited modules, either contemporaneously or at discrete times or timings. The implementation of multiple modules, whether using more components, fewer components, or the same number of components as the number of modules, is merely an implementation choice and does not generally affect the operation of the modules themselves. Accordingly, it should be understood that any recitation of multiple discrete modules in this disclosure includes implementations of those modules as any number of underlying components, including, but not limited to, a single component that reconfigures itself over time to carry out the functions of multiple modules, and/or multiple components that similarly reconfigure, and/or special purpose reconfigurable components.

In some instances, one or more components may be referred to herein as "configured to," "configured by," "configurable to," "operable/operative to," "adapted/adaptable," "able to," "conformable/conformed to," etc. Those skilled in the art will recognize that such terms (for example "configured to") generally encompass active-state components and/or inactive-state components and/or standby-state components, unless context requires otherwise.

While particular aspects of the present subject matter described herein have been shown and described, it will be apparent to those skilled in the art that, based upon the teachings herein, changes and modifications may be made without departing from the subject matter described herein and its broader aspects and, therefore, the appended claims are to encompass within their scope all such changes and modifications as are within the true spirit and scope of the subject matter described herein. It will be understood by those within the art that, in general, terms used herein, and especially in the appended claims (for example, bodies of the appended claims) are generally intended as "open" terms (for example, the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to claims containing only one such recitation, even when the same claim includes the introductory phrases "one or more" or "at least one" and indefinite articles such as "a" or "an" (for example, "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (for example, the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (for example, "a system having at least one of A, B, and C" would include but not be limited to systems that have A alone, B alone, C alone, A and B together, A and C together, B and C together, and/or A, B, and C together, etc.). It will be further understood by those within the art that typically a disjunctive word and/or phrase presenting two or more alternative terms, whether in the description, claims, or drawings, should be understood to contemplate the possibilities of including one of the terms, either of the terms, or both terms unless context dictates otherwise. For example, the phrase "A or B" will be typically understood to include the possibilities of "A" or "B" or "A and B."

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software (e.g., a high-level computer program serving as a hardware specification), firmware, or virtually any combination thereof, limited to patentable subject matter under 35 U.S.C. 101. In an embodiment, several portions of the subject matter described herein may be implemented via Application Specific Integrated Circuits (ASICs), Field Programmable Gate Arrays (FPGAs), digital signal processors (DSPs), or other integrated formats. However, those skilled in the art will recognize that some aspects of the embodiments disclosed herein, in whole or in part, can be equivalently implemented in integrated circuits, as one or more computer programs running on one or more computers (e.g., as one or more programs running on one or more computer systems), as one or more programs running on one or more processors (e.g., as one or more programs running on one or more microprocessors), as firmware, or as virtually any combination thereof, limited to patentable subject matter under 35 U.S.C. 101, and that designing the circuitry and/or writing the code for the software (e.g., a high-level computer program serving as a hardware specification) and or firmware would be well within the skill of one of skill in the art in light of this disclosure. In addition, those skilled in the art will appreciate that the mechanisms of the subject matter described herein are capable of being distributed as a program product in a variety of forms, and that an illustrative embodiment of the subject matter described herein applies regardless of the particular type of signal bearing medium used to actually carry out the distribution. Examples of a signal bearing medium include, but are not limited to, the following: a recordable type medium such as a floppy disk, a hard disk drive, a Compact Disc (CD), a Digital Video Disk (DVD), a digital tape, a computer memory, etc.; and a transmission type medium such as a digital and/or an analog communication medium (e.g., a fiber optic cable, a waveguide, a wired communications link, a wireless communication link (e.g., transmitter, receiver, transmission logic, reception logic, etc.), etc.).

With respect to the appended claims, those skilled in the art will appreciate that recited operations therein may generally be performed in any order. Also, although various operational flows are presented in a sequence(s), it should be understood that the various operations may be performed in other orders than those which are illustrated or may be performed concurrently. Examples of such alternate orderings may include overlapping, interleaved, interrupted, reordered, incremental, preparatory, supplemental, simultaneous, reverse, or other variant orderings, unless context dictates otherwise. Furthermore, terms like "responsive to," "related to," or other past-tense adjectives are generally not intended to exclude such variants, unless context dictates otherwise.

While the disclosed subject matter has been described in terms of illustrative embodiments, it will be understood by those skilled in the art that various modifications can be made thereto without departing from the scope of the claimed subject matter as set forth in the claims.

It will be appreciated that the detailed description set forth above is merely illustrative in nature and variations that do not depart from the gist and/or spirit of the claimed subject matter are intended to be within the scope of the claims. Such variations are not to be regarded as a departure from the spirit and scope of the claimed subject matter.

What is claimed is:

1. A system comprising:
    a drive system comprising one or more motors associated with a vehicle; and
    a computing device including:
        a processor; and
        computer-readable media configured to store computer-executable instructions configured to cause the processor to:
            identify an operating credential associated with an operator of a vehicle; and
            based on the operating credential associated with the operator:
                determine a performance mode associated with the operating credential; and
                facilitate restriction of at least one performance attribute of the vehicle in accordance with the performance mode;
                wherein the at least one performance attribute comprises one or more of maximum allowable acceleration and maximum allowable speed; and
                wherein the restriction causes selective engagement of the one or more motors of the drive system so as to limit the one or more of the maximum allowable acceleration and the maximum allowable speed of the vehicle.

2. The system of claim 1, wherein the at least one performance attribute further comprises one or more of maximum allowable speed relative to a speed limit, restricted access to infotainment systems, mandated use of automated driving, mandated use of autosteering, a following distance recognized by an automated driving system, a following distance recognized by a collision warning system, and a following distance recognized by an autobraking system.

3. The system of claim 1, wherein the operating credential specifies an operator classification chosen from a designated vehicle owner, an authorized regular user, an authorized guest user, an organizational role, and a job description.

4. The system of claim 3, wherein the computer-executable instructions are further configured to cause the processor to enable the designated vehicle owner to set the performance mode associated with the operator credential according to the operator classification.

5. The system of claim 1, wherein the computer-executable instructions are further configured to cause the processor to enable the operator to manually set the performance mode to restrict the at least one performance attribute.

6. The system of claim 1, wherein the computer-executable instructions are further configured to cause the processor to determine the performance mode for the operator responsive to an experience level of the operator wherein the experience level corresponds to experience with a vehicle type that includes the vehicle.

7. The system of claim 1, wherein the computer-executable instructions are further configured to cause the processor to determine the performance mode associated with the operating credential using a performance mode controller aboard the vehicle, a remote system in communication with the performance mode controller, and combinations thereof.

8. The system of claim 1, wherein the computer-executable instructions are further configured to automatically adjust the performance mode based on an at least one input chosen from a driving behavior assessment of the operator or a stipulation provided by an insurer providing coverage for use of the vehicle by the operator, or combinations thereof.

9. The system of claim 1, wherein the computer-executable instructions are further configured to cause the processor to identify the operating credential associated with the operator by recognizing an identifier chosen from a key associated with the operator, a key fob associated with the operator, a smartphone associated with the operator, a wearable device associated with the operator, or an appearance of the operator or combinations thereof.

10. A vehicle comprising:
a cabin;
a drive system comprising one or more motors; and
a computing device including:
 a processor; and
 computer-readable media configured to store computer-executable instructions configured to cause the processor to:
  identify an operating credential associated with an operator of the vehicle; and
  based on the operating credential associated with the operator:
   determine a performance mode associated with the operating credential; and
   facilitate restriction of at least one performance attribute of the vehicle in accordance with the performance mode;
   wherein the at least one performance attribute comprises one or more of maximum allowable acceleration and maximum allowable speed; and
   wherein the restriction causes selective engagement of the one or more motors of the drive system so as to limit the one or more of the maximum allowable acceleration and the maximum allowable speed of the vehicle.

11. The vehicle of claim 10, wherein the at least one performance attribute further comprises one or more of maximum allowable speed relative to a speed limit, restricted access to infotainment systems, mandated use of at least one of automated driving and autosteering, and a following distance recognized by at least one of an automated driving system, a collision warning system, and an autobraking system.

12. The vehicle of claim 10, wherein the operating credential specifies an operator classification chosen from a designated vehicle owner, an authorized regular user, and an authorized guest user, an organizational role, and a job description.

13. The vehicle of claim 10, wherein the computer-executable instructions are further configured to cause the processor to enable a designated vehicle owner to set the performance mode associated with the operator credential according to an operator classification.

14. The vehicle of claim 10, wherein the computer-executable instructions are further configured to cause the processor to adjust the performance mode for the operator responsive to an experience level of the operator with a vehicle type that includes the vehicle.

15. A computer-implemented method comprising:
identifying an operating credential associated with an operator of a vehicle; and
based on the operating credential associated with the operator:
 determining a performance mode associated with the operating credential; and
 facilitating restriction of at least one performance attribute of the vehicle in accordance with the performance mode;
 wherein the at least one performance attribute comprises one or more of maximum allowable acceleration and maximum allowable speed; and
 wherein the restriction causes selective engagement of one or more motors of a drive system associated with the vehicle so as to limit the one or more of the maximum allowable acceleration and the maximum allowable speed of the vehicle.

16. The computer-implemented method of claim 15, wherein the at least one performance attribute further comprises one or more of maximum allowable speed relative to a speed limit, restricted access to infotainment systems, mandated use of at least one of automated driving and autosteering, and a following distance recognized by at least one of an automated driving system, a collision warning system, and an autobraking system.

17. The computer-implemented method of claim 15, wherein the operating credential specifies an operator classification chosen from a designated vehicle owner, an authorized regular user, and an authorized guest user, an organizational role, and a job description.

18. The computer-implemented method of claim 15, further comprising enabling the operator to manually set the performance mode to restrict the at least one performance attribute.

19. The computer-implemented method of claim 15, further comprising adjusting the performance mode for the operator responsive to an experience level of the operator with a vehicle type that includes the vehicle.

20. The computer-implemented method of claim 15, further comprising automatically adjusting the performance mode based on an at least one input chosen a driving behavior assessment derived from monitored driving behavior of the operator an insurer stipulation provided by an insurer providing coverage for use of the vehicle by the operator.

* * * * *